US009887947B2

(12) United States Patent
Snider et al.

(10) Patent No.: US 9,887,947 B2
(45) Date of Patent: Feb. 6, 2018

(54) INCENTIVIZED MESSAGE DISPOSITION APPARATUS AND TIME LIMITED METHOD FOR OPERATION

(71) Applicant: Notion AI, Inc., Ann Arbor, MI (US)

(72) Inventors: Lindsay Snider, Ann Arbor, MI (US); Ian Berry, Ann Arbor, MI (US); Guy Suter, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 134 days.

(21) Appl. No.: 14/626,914

(22) Filed: Feb. 19, 2015

(65) Prior Publication Data

US 2016/0248712 A1    Aug. 25, 2016

(51) Int. Cl.
*H04L 12/58* (2006.01)
*H04L 29/08* (2006.01)

(52) U.S. Cl.
CPC .............. *H04L 51/18* (2013.01); *H04L 51/22* (2013.01); *H04L 51/34* (2013.01); *H04L 67/02* (2013.01)

(58) Field of Classification Search
CPC ....................................................... H04L 51/22
See application file for complete search history.

(56) References Cited

U.S. PATENT DOCUMENTS

| | | | | |
|---|---|---|---|---|
| 6,122,372 A * | 9/2000 | Hughes | ................. | H04L 9/3236 380/2 |
| 7,991,848 B2 * | 8/2011 | Oh | ....................... | G06Q 10/107 709/206 |
| 8,185,492 B2 * | 5/2012 | Mayers | .................... | H04L 12/58 706/45 |
| 8,555,156 B2 * | 10/2013 | Cairns | ................... | G06F 3/0481 434/178 |
| 9,088,535 B1 * | 7/2015 | Baird | .................... | G06Q 10/107 |
| 2007/0118602 A1 * | 5/2007 | Heinla | .................... | H04L 51/22 709/206 |
| 2007/0177219 A1 * | 8/2007 | Shinozaki | .......... | H04N 1/00838 358/304 |
| 2008/0270560 A1 * | 10/2008 | Tysowski | ................ | H04L 51/14 709/207 |
| 2010/0169485 A1 * | 7/2010 | Hazlewood | ......... | H04L 61/1523 709/225 |

(Continued)

*Primary Examiner* — Lashonda Jacobs
(74) *Attorney, Agent, or Firm* — Jeffrey Schox; Padowithz Alce (57) ABSTRACT

A circuit transmits a beneficiary to a benefits server when a message recipient has disposed of an incentivized message by opening and attending to the message. A navigation and viewport control circuit presents a précis of an incentivized message with a proposed time to disposition (TTD), a proposed disposition, and a proffered benefit for at least minimally engaging with the message; records the time the message is opened; and whether the required minimum has been attained. A message transformation and disposition apparatus retrieves, from a benefit server, a decay or expiration time, a required quantum of engagement, and a proffered benefit. Stored disposition history of recipient and peers is read to determine a proposed disposition and TTD according to user's preferences for benefits and their expiration dates. A timer causes performance of the proposed disposition depending on user's activity or inactivity. Engagement can require passive viewing or non-random interacting.

18 Claims, 7 Drawing Sheets

(56) References Cited

U.S. PATENT DOCUMENTS

2014/0025751 A1\* 1/2014 Dietz ................ H04L 12/1827
709/206
2016/0065505 A1\* 3/2016 Iskander ............. G06F 3/0488
715/752

\* cited by examiner

INCENTIVIZED MESSAGE DISPOSITION APPARATUS AND TIME LIMITED METHOD FOR OPERATION

CROSS-REFERENCES TO RELATED APPLICATIONS

The present application is a non-provisional of currently pending provisional application, Incentivized Message Velocity Apparatus and Method for Operation, Ser. No. 61/942,247 was filed on 20 Feb. 2014.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

Electronic message processing and user interface devices.

Description of the Related Art

Well known electronic means for communication such as email messaging are multiplying by text, voice messaging, tweets, short message service (sms), images, photos, sounds, which result in overloading the recipients.

A growing problem for electronic communication is that there is little cost to a user hoarding unread, undisposed, obsolete messages in which a few important (to someone) communications are undistinguished from lower value clutter. In some cultures, a reply with a decision, a commitment, information, or a result is appreciated. For the purpose of clarifying the invention within the disclosure we define certain terms:

Disposition of electronic communication is defined to include reading and forwarding an email to another recipient, reading and replying to the sender of an email, engaging with the message, reading an email within a premium period, reading an email after the premium period, archiving an email, and deleting an email. Messages include other than email such as voice messages, faxes, multimedia messages, tweets, and feeds.

It is known that OAuth is an evolving framework and open standard for authorization. OAuth provides a method for clients to access server resources on behalf of a resource owner (such as a different client or an end-user). It also provides a process for an end-user to authorize third-party access to his server resource without sharing his credentials (typically, a username and password pair), using user-agent redirections.

IETF RFC 6749 discloses: an OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf. This IETF specification replaces and obsoletes the OAuth 1.0 protocol described in RFC 5849.

OAuth provides an authorization layer to separate the role of the client from that of the resource owner. In OAuth, the client requests access to resources controlled by the resource owner and hosted by the resource server, and is issued a different set of credentials than those of the resource owner.

Instead of using the resource owner's credentials to access protected resources, the client obtains an access token—a string denoting a specific scope, lifetime, and other access attributes. Access tokens are issued to third-party clients by an authorization server with the approval of the resource owner. The client uses the access token to access the protected resources hosted by the resource server.

What is needed is a way to incentivize timely disposition of an electronic communication by a recipient. It can be appreciated that what is needed is a way to actively engage a recipient to be attentive to selected items in his or her email inbox.

BRIEF SUMMARY OF THE INVENTION

A message handling system interacts with a benefit proffer server: first, to obtain and present the proffer; and, subsequently, to prosecute the terms of the incentivized message fulfillment by monitoring the recipient's viewport.

A circuit transmits a directed beneficiary of a specific fulfillment event to a benefit proffer server when a message recipient has disposed of an incentivized message by opening and attending to the message for a required quantum of engagement prior to the expiration of the proffer.

The message is deleted by a message disposition circuit when the benefit proffer expires.

A message navigation and viewport control circuit presents to a user a précis of an incentivized message which includes an annotation of a benefit for engaging (reading, listening, playing, sensing) the message for a required quantum of engagement (e.g. >9 seconds); records the time when the message is opened; and whether the required quantum of engagement has elapsed.

A user can set filters to rank the incentivized messages by the larger size of the incentive, or by the smallest quantum of engagement or by some tradeoff between the two. A user can set a target for incentives or a limit to time spent on incentivized attendance. A user can choose which beneficiary receives the benefits.

A message transformation and disposition apparatus retrieves from a benefit server, a decay or expiration time, a required quantum of engagement, and a proffered benefit for fulfilling the disposition within the decay or expiration window. Independently, the message transformation and disposition apparatus determines a proposed time to disposition (TTD) and proposed disposition from a store of message dispositions by the recipient or by the recipient's peers.

Messages which are linked to incentives can be very short, possibly only a subject line or tweet because the payload will be delivered through another channel. When a user does not check messages for days or weeks, all the expired proffers are automatically purged without consuming his attention when he revisits his message server.

Benefits may be offered in money, minutes, mileage, or comestibles.

A system has a message transformation and disposition apparatus coupled to a message server and coupled to a proffered benefit server. After transformation of a message into a message précis, a navigation and viewport control apparatus enables a user to dispose of the messages with or without obtaining the proffered benefit.

Examples of message dispositions include but are not limited to deletion, archive, flagging, read, play, reply-to, move, forward, and combinations of these operations. A service utilizes the system to provide message senders with an enhancement to incentivize recipients to read or otherwise dispose of messages more promptly and displays the incentive with an excerpt of the message.

A service accepts an economic inducement and an electronic communication from a sender. The sender is willing to motivate the recipient to read his message with an economic inducement. The service might be on commission, or on retainer, or on a fixed fee for successful response to a communication.

A schedule of desired dispositions vs. timeframes for an intended recipient to attend to the electronic communication controls the transfer of economic inducement from sender to recipient. There may be a premium for some timeframes or some reactions.

Disposition by forwarding, also forwards a portion of the economic inducement. Or more incentive could be added to encourage chain mails if there is a payoff at the end. A premium inducement is earned for disposition by replying to the sender.

A recipient of an email earns an economic value when the email is read, replied-to, or forwarded before the decay or expiration date (read-by). A recipient may define his own incentives and budget the volume and subjects which would be acceptable.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2-6A are block diagrams of the components of two apparatuses of the system.

DETAILED DISCLOSURE OF EMBODIMENTS OF THE INVENTION

The present invention provides system components that associate incentives with messages, display excepts of each message with its incentive, and transfer economic value to a beneficiary on the condition that the message is disposed in a way desirable to the sender.

One aspect of the invention is a system for accelerated disposition of an incentivized message by a message recipient that includes: a navigation and viewport control circuit (navigator); and, a transformation and disposition apparatus (disposer); wherein the navigator has an instrumented viewport that determines a start time and elapsed time of a message engagement, and wherein the disposer includes a circuit to report to a benefit proffer server a beneficiary of an incentivized message fulfillment when a minimum quantum of message engagement has been determined prior to expiration of a proffered benefit.

In an embodiment, the navigator further includes a circuit to present in the instrumented viewport a selectable list of incentivized messages along with a proffered benefit, wherein the selectable list is ranked by at least one of the benefit, the expiration date, and the minimum quantum of engagement.

In an embodiment, the disposer includes a circuit to retrieve from the benefit proffer server a minimum quantum of engagement within the viewport, the benefit offered upon fulfilling the minimum quantum of engagement, and at least one of a decay rate and an expiration date; and a circuit to delete incentivized messages that have passed one of their expiration date or to delete incentivized messages that have substantially decayed.

The disposer also has a disposition store for messages previously disposed by recipient and a circuit to read the disposition store and propose a time to disposal and propose a disposition for similar messages.

In an embodiment the disposer also has a circuit to transmit disposition history to a reputation server and to request from the reputation server a proposed time to disposal and proposed disposition most common among recipient's peers.

Another aspect of the invention is a system that includes a message transformation and disposition apparatus (transformer) that retrieves message metadata and body content from a message server to generate a message précis, the transformer coupled to a proffered benefit server, and a navigator that displays a selectable message précis with proffered benefit and benefit expiration date that enables message deletion, and message opening.

A user operates the message navigation control to display message précises, to select message precises, and to issue commands to operate on message precises. A message précis is easily distinguished from conventional message metadata by inclusion of a proposed disposition, and a proposed time to disposal (TTD). According to the message type, its précis also may have a soundbite of a voice or audio file, a thumbnail of an image, or an excerpt of a text message, or a logo/shape associated with a benefit.

In an embodiment, the transformer retrieves from the proffered benefit server: an expiration date for engaging with the message, a minimum quantum of engagement, and a benefit for attending to the message at least the minimum quantum of engagement before the expiration date.

One non-limiting example of a minimum quantum of engagement is listening to an audio stream for ten seconds. Another non-limiting example is viewing a video or a text message for a minute. The message may "ask" the recipient to forward it to another recipient. The "ask" may be to add to a calendar. The minimum quantum of engagement may be to answer at least 5 questions in a survey. Some interaction with the message may be done by voice, by gesture, by operating the user interface (mouse, keyboard, touchscreen) during the timespan of the message presentation or within a short time of the end of the message. A quantum of engagement may be moving the message from one folder to another within a short period of time. If the user enables it, a quantum of engagement may use a camera of the user interface device.

In an embodiment, the navigator provides an instrumented viewport and navigation control to sense when the message précis enters the viewport, when the user opens a message, and when the user deletes a message.

In an embodiment, the transformer also has a circuit to transmit to the proffered benefit server a report to identify a beneficiary of an incentivized message fulfillment when a minimum quantum of message engagement has been determined prior to expiration of a proffered benefit.

In an embodiment, the transformer also has a command circuit to delete the message from the message server at the earlier of the expiration date and the user causing the message to be deleted.

Another aspect of the invention is a system that includes: a message transformation and disposition apparatus (transformer) that retrieves message metadata and body content from a message server to generate a message précis, with recipient's disposition store that contains recipient's previous message dispositions and time-to-disposal (TTD) coupled to proffered benefit server and navigator.

In an embodiment the system also has a circuit that upon receiving the message metadata, determines a proposed TTD and a proposed disposition when recipient has recently disposed a similar message.

In an embodiment, the navigator also has a circuit to display a selectable message précis, a benefit, a proposed TTD, and a proposed disposition in an instrumented viewport that senses when a message enters the viewport, when the message is opened, and when the message is deleted.

In an embodiment, the transformer also has a timer that is triggered by the instrumented viewport and that causes performance of the proposed disposition when the proposed TTD matures absent intervention by the user.

In an embodiment, the transformer also has a circuit to store the details of message disposition into disposition store and to transmit to the proffered benefit server a report when the user has attended to the message for at least the minimum quantum of engagement prior to the expiration date.

Figure 1:
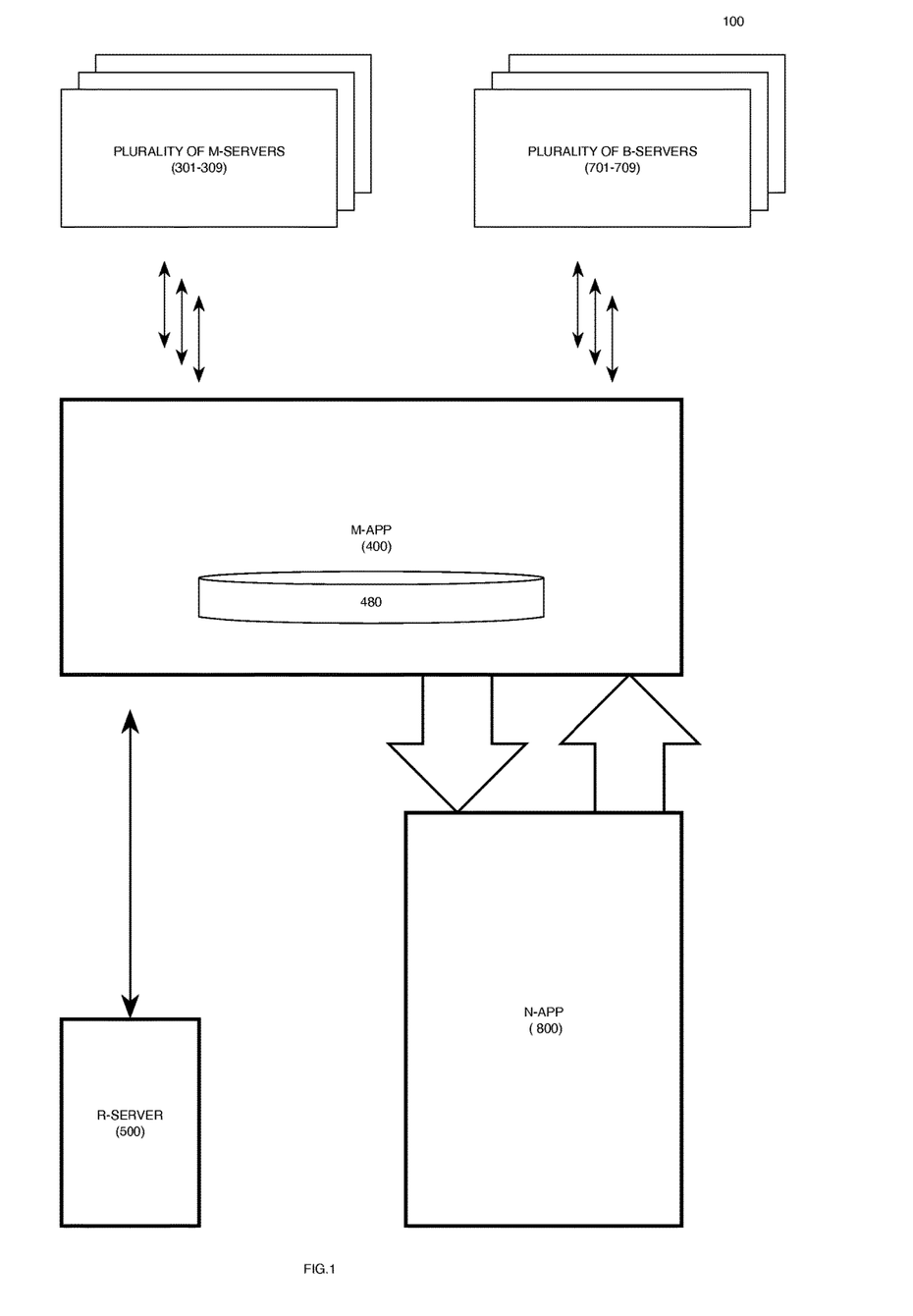
FIG. 1 is a block diagram of a system.

Referring now to the figures, another aspect of the invention illustrated in FIG. 1 is a system 100 that includes: M-APP, a message transformation and disposition apparatus (transformer) 400 with recipient's disposition store 480, R-SERVER, a reputation server 500, the transformer coupled to at least one B-SERVER proffered benefit server 701-709, the transformer coupled to at least one M-SERVER message server 301-309; and, an N-APP précis navigation and viewport control apparatus (navigator) 800.

Figure 2:
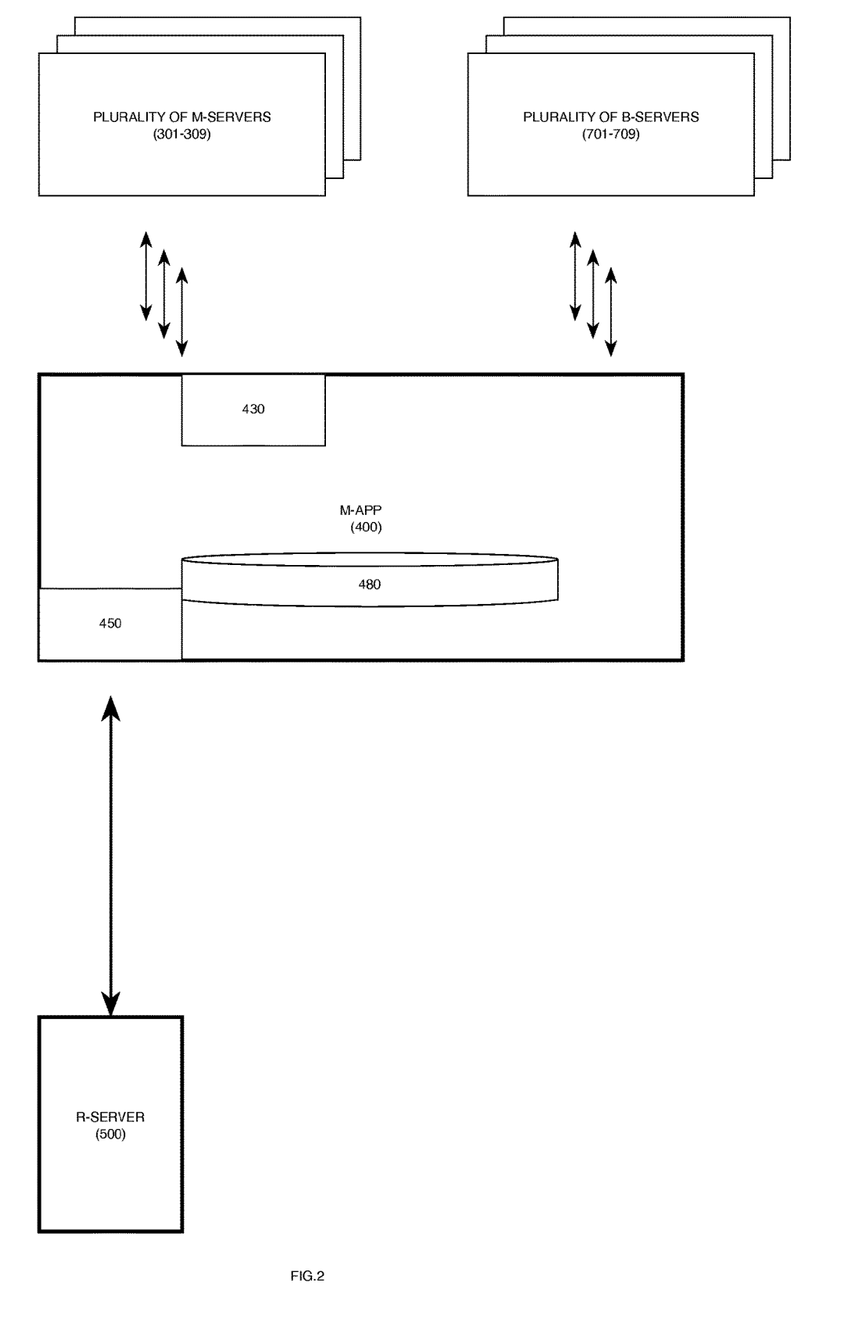

Referring now to FIG. 2 in an embodiment, the transformer 400 includes a circuit 481 to determine a condition that recipient has not recently disposed of a message similar to an incentivized message received via interface circuit 430 and, on that condition, to transmit a request to a reputation server for a proposed TTD and a proposed disposition.

Figure 3:
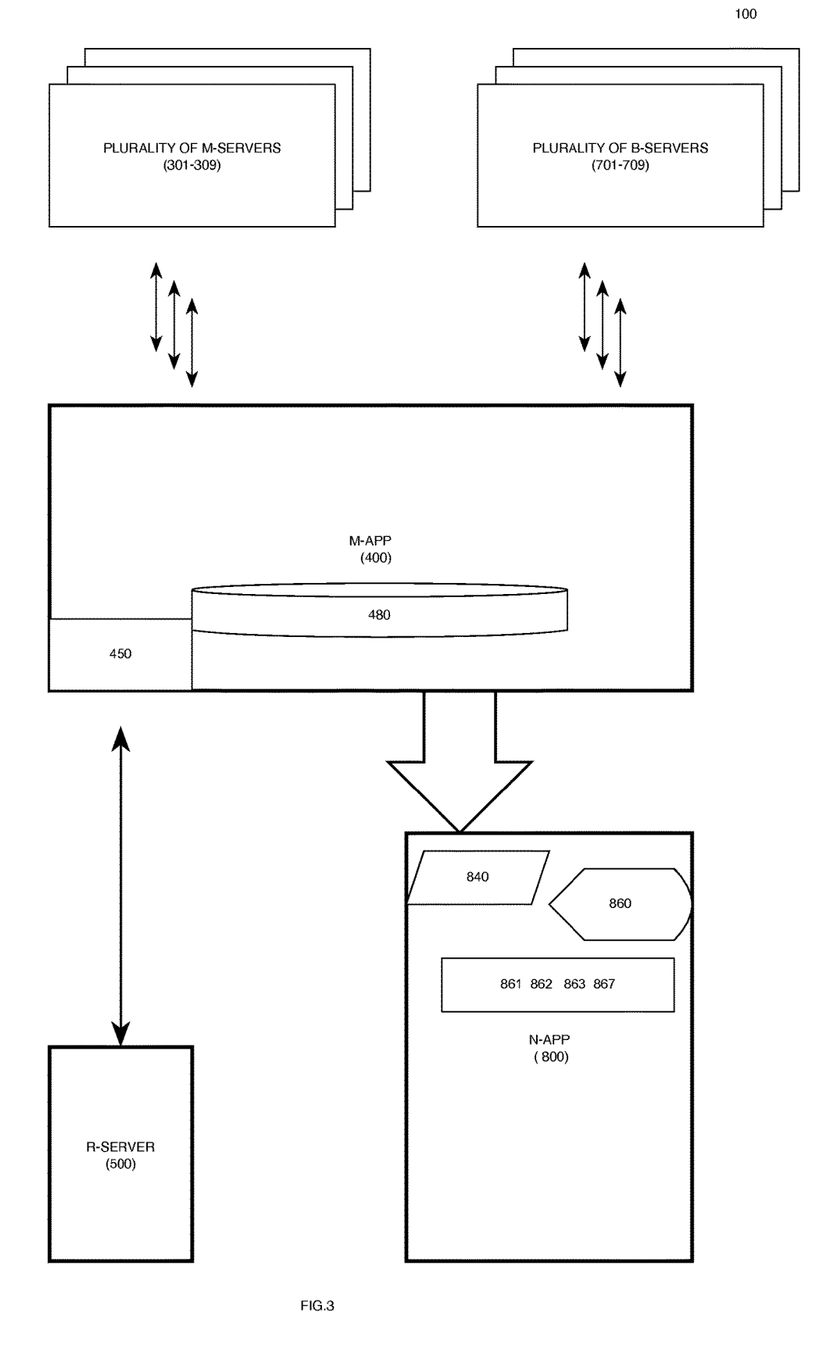

Referring now to FIG. 3, in an embodiment, the navigator 800 has a circuit to display 840 a message précis, proposed disposition provided by a reputation server, proposed TTD provided by a reputation server, and benefit in an instrumented viewport 860 which senses when a message précis enters the viewport 861, when a message is opened 862, when a message is deleted 863, and determines a start time and elapsed time of a message engagement 867.

In an embodiment, the proposed TTD and proposed disposition is affected by user's selected benefit limits, objectives, and preferences and may be overridden within the navigator.

Figure 4:
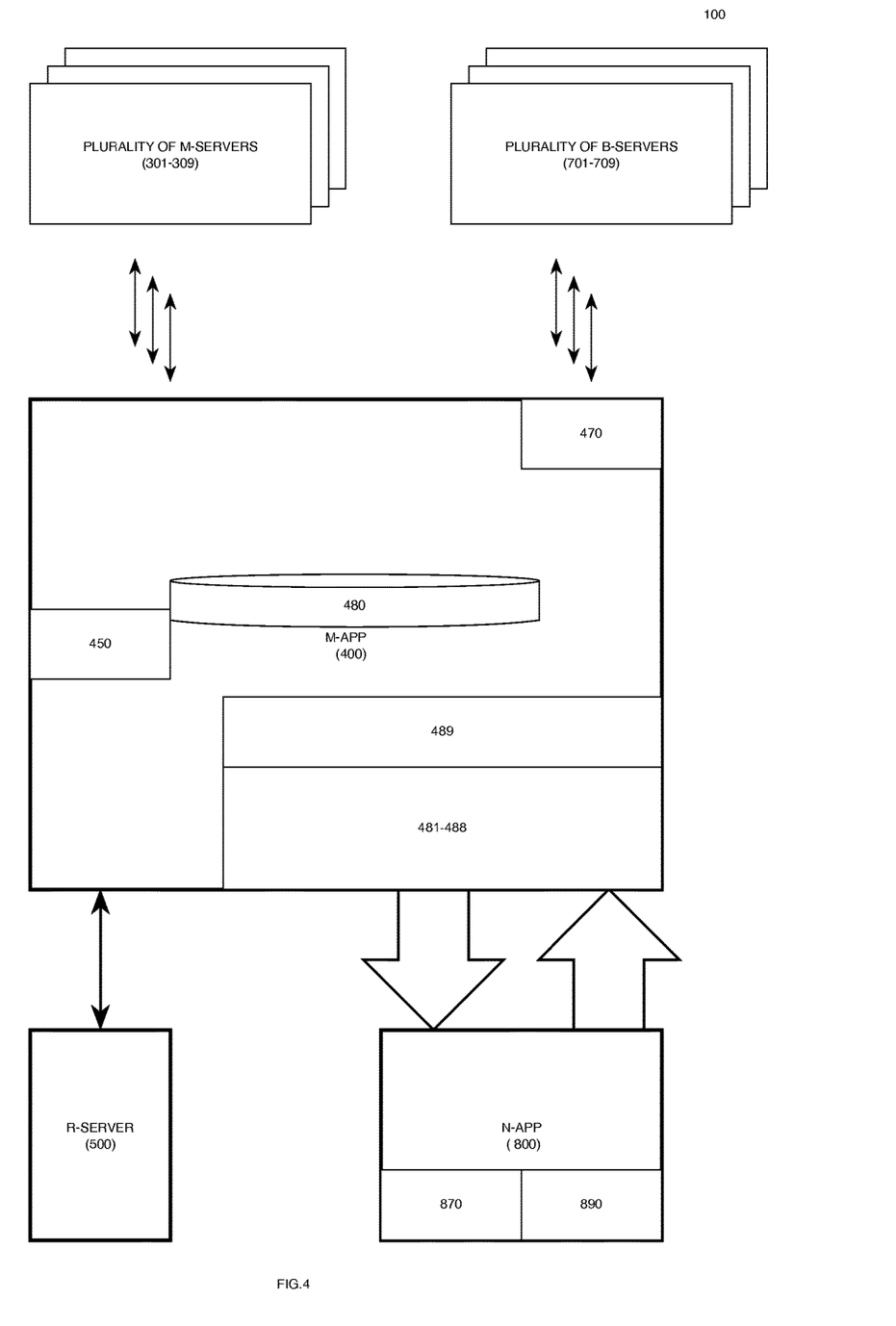

Referring now to FIG. 4, in an embodiment, the transformer 400 has a timer 481-488 initialized by the instrumented viewport to the proposed TTD and a circuit 489 to perform the proposed disposition when the timer matures.

In an embodiment, the transformer also has a circuit 470 to retrieve from the benefit proffer server a minimum quantum of engagement within the viewport, the benefit offered upon fulfilling the minimum quantum of engagement, and at least one of a decay rate and an expiration date; and, the navigator also has a circuit 870 to display a selectable list ranked by at least one of the benefit, the expiration date, and the minimum quantum of engagement In an embodiment, the system also has a user-operated control panel 890 whereby a recipient determines message senders whose dispositions shall inform a proposed TTD and proposed disposition, and a beneficiary to receive proffered benefits, and a minimum or maximum of benefits, time expended, or messages attended to control the viewport display.

Figure 5:
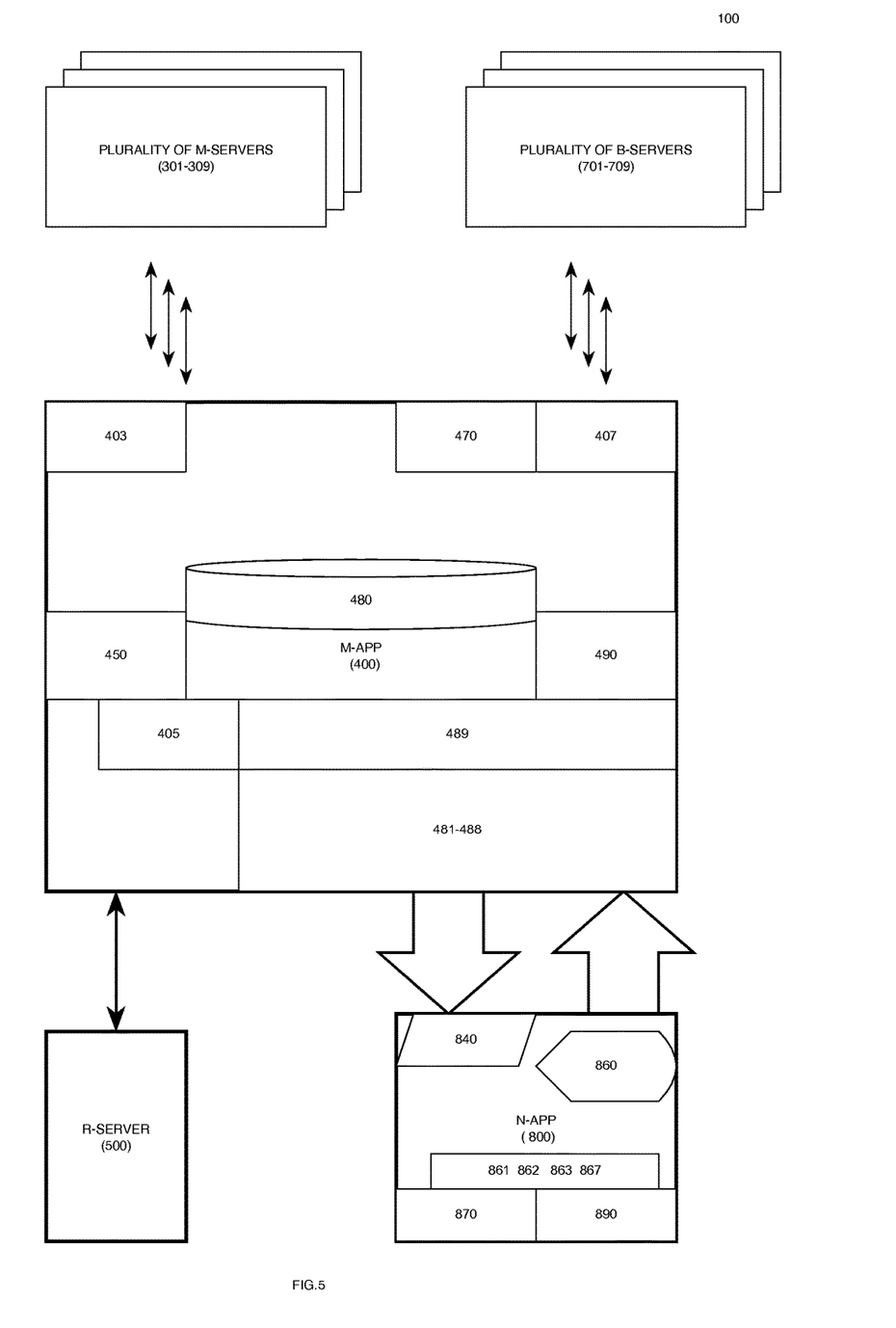

Referring now to FIG. 5, in an embodiment, the system also has circuits 403, 405 to transmit to a reputation server recent dispositions, and to transmit commands to a message server to dispose of messages, a circuit 490 to store the details of message disposition to disposition store and a circuit 407 to transmit to the proffered benefit server a report when the user has attended to the message for at least the minimum quantum of engagement prior to the expiration date.

Figure 6:
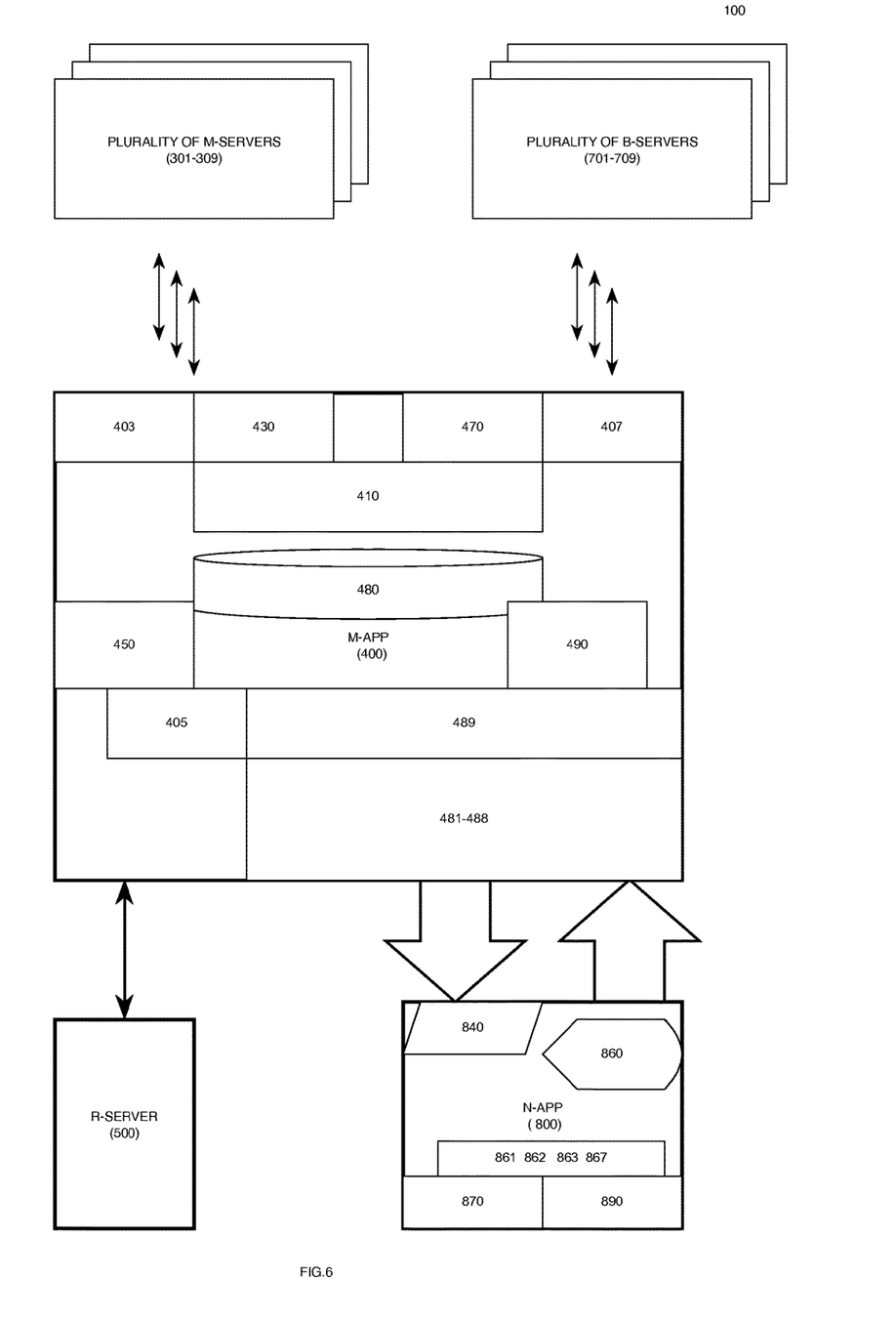
Figure 6A:
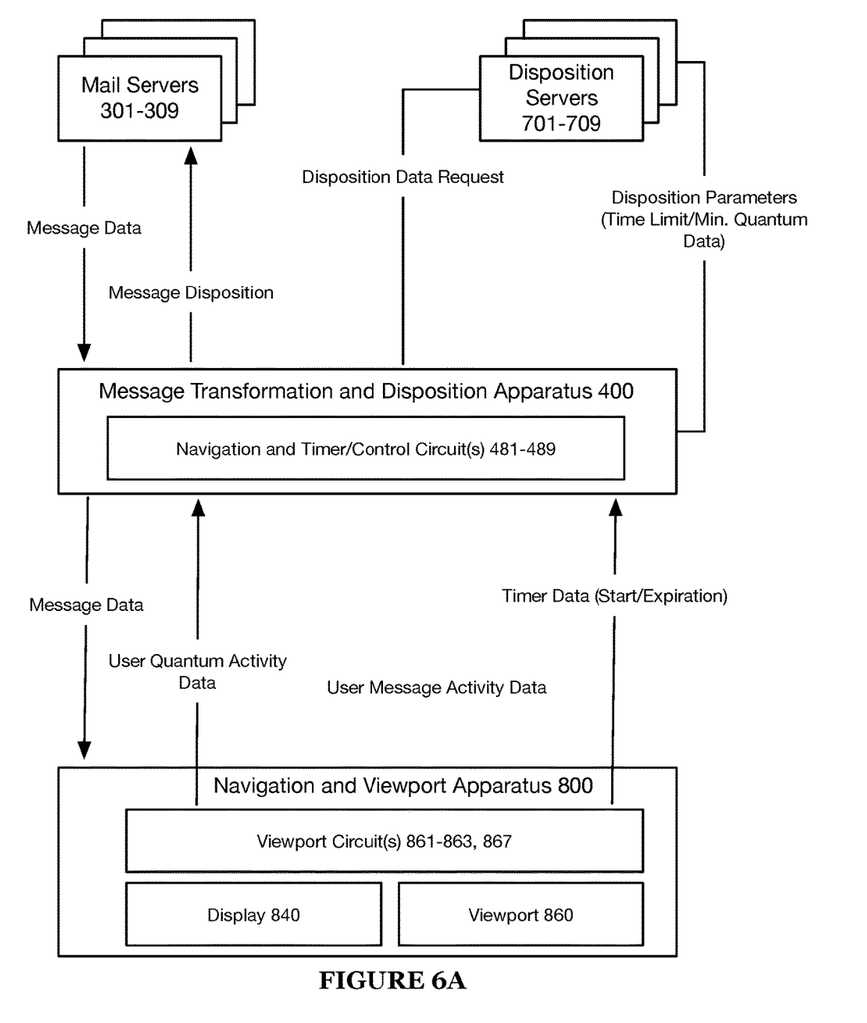

Referring now to FIGS. 6-6A, the transformer generates a précis using a circuit 410 which receives metadata and message body from a message server 301-309 via interface circuit 430 and benefit, expiration date, and minimum quantum of engagement from the benefit server 701-709. In an embodiment, a précis includes a thumbnail reduced size image from a video or a soundbite. In an embodiment, a précis includes an image of a text string excerpted from a message body.

Message précis are stored into an N-dimensional array of categories and ranks. User controls determine if these message precises are presented in a 1 dimensional list, a 2 dimensional table, or some other visualization.

A message précis navigation interface scrolls and or pans message précis into or out of a viewport. The viewport displays metadata for each message including the sender, date, subject, a proposed disposition, a proposed TTD, and the proffered benefit. When a précis has been present within the viewport more than a threshold of time, a timer is started. The recipient may stop or reset the time to a shorter or longer period. Unless the recipient operates on the message précis, the proposed disposition is performed upon completion of the timer.

The message transformation and disposition apparatus (transformer) comprises an interface circuit to access at least one message server. The transformer includes a commands transmitter that sends commands to a message server such as but not limited to retrieve, delete, open, play, archive, forward, and reply. The transformer includes a plurality of timer circuits for each message précis and a timer control circuit that receives commands from the recipient display and control apparatus to start, stop, and reset any timer. A message disposition circuit implements a disposition command received from a recipient display and control apparatus or upon timer expiration a proposed disposition. A message disposition store records a plurality of disposition actions and times for each sender. For each received message, a disposition proposer circuit reads the most recent dispositions and times if a sender has a stored record in the disposition store and proposes a disposition and a time to execute the proposed disposition.

A categorization circuit groups messages by type, or by sender organization, or by subject matter or by message type. In an example, messages from family are grouped, messages relating to work are grouped, messages relating to finances are grouped, messages relating to hobbies or interests are grouped.

A ranking circuit sets a priority for messages within each group. Messages with a proposed disposition of deletion are of lowest priority. Messages with long time-to-disposal have lower priority than messages with shorter time-to-disposal. Messages whose proposed disposition is to forward or reply have higher priority than messages whose proposed disposition is to archive.

Ranking may take into account the magnitude of the benefit, the minimum engagement time, a combination or tradeoff, and the user's preferences, limit, or targets.

The message transformation and disposition apparatus transforms a plurality of messages into précis which have proposed TTD and proposed dispositions, groups, and ranks. The apparatus transforms minimal activity of the recipient into operations at the message server.

The recipient display and control apparatus has a viewport through which précis may be presented to the user. A navigator circuit determines which précis are displayed. A timer signaling circuit transmits events to the message transformation and disposition apparatus when a message précis is within the viewport for a time greater than a threshold, when the message is selected or when the message is disposed. A message status circuit removes message précis from the store when deleted and signals the message transformation and disposition apparatus to transmit commands to the message server. A message control circuit causes messages to be fully displayed when selected, receives and performs deletion commands, receives and executes timer reset commands, and configures the viewport to appear as a list, a table, or an other form of display.

The recipient display and control apparatus transforms a collection of message précis into a selectable list or table. The apparatus transforms minimum activity on the part of the user into disposition commands and stores the dispositions for future replication.

In an embodiment, a message transformation and disposition apparatus includes: a circuit to transmit a sender identity to at least one of a plurality of reputation servers; a circuit to set a maximum number of strong relationships which recipient wishes to inform a reputation server; a circuit to edit a list of strong relationships which recipient wishes to inform a reputation server; a circuit to transmit to a reputation server, a list of senders previously known to recipient who have a strong relationship as measured by a recent history of bidirectional, prompt, verbose message exchanges; and a circuit to receive from a reputation server, a rating of a sender's reputation by recipient's own list of senders with whom recipient has had a strong relationship or of organizations that recipient is a member.

In an embodiment, a recipient display and control apparatus also has: a circuit to assign to a message with a reputation rating from a reputation server a category and ranking substantially similar to a message from a sender known to recipient who has the strongest relationship with the sender not known to 1st recipient.

In an embodiment, the message transformation and disposition apparatus (transformer) includes: a circuit to request and receive from a reputation server a proposed most likely time to disposal (TTD) and a proposed most likely disposition for a message sent by a sender not previously known to a first recipient; a store of message dispositions performed by the first recipient; a circuit to transmit to the reputation server an update of message dispositions by first recipient that includes the sender identities; and a control to select and designated which message senders known to the first recipient shall populate a jury whose message dispositions determine the proposed most likely.

In an embodiment, the reputation server includes: a circuit to receive recent message disposition history from a plurality of message recipients; a circuit to determine which message senders designated by a first recipient should populate a jury to determine a most likely disposition; a circuit to receive metadata concerning a sender not previously known to the first recipient; and a circuit to transmit to the 1st recipient, the most likely disposition among first recipients jury of a message from the sender not previously known to the first recipient.

Another aspect of the invention is a system for message disposition acceleration by a recipient that includes: a message navigation and viewport control apparatus (navigator) that has an instrumented viewport to record disposition of messages and time from when each message first entered the viewport until each message is disposed; and, a message transformation and disposition apparatus (disposer) that has a store of recipient's message dispositions and each time-to-disposition (TTD) for messages received by recipient and a store of message dispositions and TTD performed by one or more of recipient's message senders.

A benefit for minimal engagement to a message is offered and fulfilled by a sender to a beneficiary. A message recipient may direct benefits to his own account or to his favorite charity or politician. A message sender may set a minimum quanta of engagement and a decay time or rate to attend to the message. An example of a benefit message would be: sender will provide 333 airline miles if recipient focuses attention for at least 11 seconds within 22 days.

One aspect of the invention is a method at an email client which has the steps, receiving an activity aware electronic communication (aaecom); initiating a value visualization process; displaying upon request an acknowledgement activator; presenting the associated aaecom; and storing an economic value metric from the value visualization process and the data and time when the acknowledgement activator is selected.

Another aspect of the invention is a method which includes at least the steps, at an economically aware electronic communication server (eacomServer), receiving an electronic communication intended for a recipient; embedding a value visualization process program; embedding an acknowledgement activator; debiting a sender's account for an economic value; associating a schedule of desirable dispositions vs. timeframes for recipient response to the electronic communication; transmitting a transformed aaecom to the recipient; and when all timeframes expire without an acknowledgement from the recipient, crediting the whole of the economic value back to the sender's account; or when a disposition acknowledgement is received from the recipient, crediting a portion of the economic value to the recipient's account.

In an embodiment, a desirable disposition and timeframe is a reply within Y minutes.

In an embodiment, a desirable disposition and timeframe is a forward-to within Z hours.

In an embodiment, the economic value is scaled up for a reply within X minutes.

In an embodiment, a circuit, such as a processor coupled to a non-transitory instruction store, determines a condition of read or viewed for an electronic document (email) in an email client when the email gets scrolled past a specialized viewport screen.

In an embodiment, the determination is also time/speed sensitive. In an embodiment, if an operator of an email client rapidly scrolls to the bottom of his inbox it might not count as read. But, if the operator scrolls slowly i.e. below a threshold, the messages are considered read.

In an embodiment, if the operator opens the email, the signaller circuit can time how long the email is versus how long the operator has been looking at it to estimate read percentage Another aspect of the invention is an apparatus for improving the velocity of message turns by transferring an incentive to a recipient having a circuit to receive an incentivized message from an incentive server; coupled to, a circuit to display an excerpt of the incentivized message and the incentive associated with opening and dwelling on the incentivized message; a circuit to determine a time of opening and measuring a minimum time for dwelling on the incentivized message; and a circuit to report to the incentive server the times of opening and dwelling on the incentivized message.

In an embodiment, the apparatus also has a circuit to record and report to the incentive server a message disposition and time of disposition.

In an embodiment, a message disposition is opening a related application wherein a related application is one of the following a web browser, a phone app, a text message app, a contacts manager, a reading app, a shopping app, and a calendar app.

In an embodiment, the apparatus also has a circuit to receive and store recipient's thresholds to control message display; and a circuit to select messages to display when said messages meet recipient set thresholds.

In an embodiment a recipient set threshold is a maximum number of incentivized messages for display per day.

In an embodiment, a recipient set threshold is a minimum incentive value per message.

In an embodiment, the apparatus also has a circuit to transmit to the incentive server a third party beneficiary selected by the recipient; a circuit to transmit to the incentive server a maximum number of incentivized messages set by the recipient enabled for display per day; and a circuit to transmit to the incentive server a minimum incentive value per message set by the recipient enabled for display.

In an embodiment, a circuit, such as a processor coupled to a non-transitory instruction store, determines a condition of read or viewed for an electronic document (email) in an email client when the email is scrolled past within a specialized viewport screen. Note, email does not need to be opened as the excerpt is normally enough to get the context In other embodiments, the signaler circuit can boost the incentive if the message is forwarded to the recipient's boss.

In other embodiments, a signaler circuit measures how long the operator left a message in his inbox, if he replied and how long he waited to reply, if he deleted it, if he opened it, if he moved it and to where, or if he ignored it. The invention then uses all of these metrics to build intelligence on how important that email is to its recipient.

In an embodiment, the economic value is shared between the recipient and his first forward-to when the first forward-to operates the acknowledgement activator.

Disbursing or accruing economic value could be via ebooks, itunes, gift cards, caffeine, postage, virtual services, and energy all of which have established locations for transformation into material goods and services.

In an embodiment, the incentive may be transferred upon performance of a desired task in addition to tying bounties to seeing, replying, forwarding: such as but not limited to taking an action, filling out an HTML survey within the email, responding with a 'thoughtful' i.e. non-trivial response, or initiating a chat, voice, or video connection.

In an embodiment, a potential receiver may select from a catalog of awards, benefits, incentives, or setup rules and financial requirements for those wishing to send a message, e.g. take W number of emails from retailer W every month for $1. An executive decision-maker may consider a limited number of unsolicited inquiries and reply for $100.

In an embodiment, a receiver may set his own preferences and cost of messaging. The receiver can submit to unsolicited emails based on their subject and volume preferences, e.g. up to 3 unsolicited emails per day; only take those 3 emails per day if they add up to at least $10; take unsolicited emails from one of the following: online advertisers, automotive companies, financial companies. In an embodiment, the system filters preferences and offers gatekeeping/access to messengers willing to pay the recipients for being on a lead list.

In an embodiment, a value visualizer is initiated when an electronic communication is received showing the remaining time to disposition related to the timely resolution of the item. e.g. a fuel gauge, a stack of espresso cups, batteries, or currency symbols.

In an embodiment, a sender may offer a financial incentive to the recipient and the apparatus may effect an auction by determining the highest offered financial incentive. The recipient would be shown the message with the highest value of financial incentive or shown all messages with the value of the financial incentive displayed. Based on the recipient's behavior, future received messages will be filtered.

CONCLUSION

The system is easily distinguished from conventional email services which only track the delivery of electronic communications to a server or to a client but which do not compensate a recipient for opening the communication (reading, hearing, seeing, feeling) in a timely manner. The system is easily distinguished from services that charge a fee for transmitting or delivering without any difference if the content is opened, left in the inbox, or discarded without being read.

The system is easily distinguishable from conventional push advertising by enabling a receiver to publish his interests, set a budget on the volume of pertinent messages accepted, and define the incentive or value that the receiver considers adequate compensation for attending and responding.

A sender of an email offers an economic incentive to attend to it in a timely manner. Instead of paying for advertising, or courier service, or a telegram, or tchotskes, the sender is willing to put money in the pocket of the recipient to read or favorably dispose a message within a period of time. Beneficially, when the message is ignored or goes stale, the sender gets the money back or substantially all of it. The value was not the transmission but in getting the recipient to actually deal with it within the desired timeframe. The mail comes from the sender not from an intermediary. The economic inducement of undisposed electronic communications is returned to the sender. It is more attractive than advertising because the cost of failure is not borne by the sender.

The economic value available to the recipient expires or shrinks as the electronic communication becomes stale. There is less value to time-critical information delivered too late. Earlier commitment may reduce stress and anxiety for the sender.

Thus it can be appreciated that the invention has two major components. A message transformation and disposition apparatus (transformer) retrieves message précis. A message précis is a transformation of metadata and the body content as well as information retrieved from a proffered benefit server. The proffer includes at least three parts: an expiration date for engaging with the message, a minimum quantum of engagement, and a benefit for attending to the message at least the minimum quantum of engagement before the expiration date.

The second major component is a précis navigation and viewport control apparatus (navigator) that displays a selectable message précis with proffered benefit and benefit expiration date and that enables message deletion, message moving, message forwarding, message flagging, and message opening. The navigator is most likely to be distributed and local to each user and measures the user's activity or inactivity, choices, and displays. The transformer might be remote and centralized or also local to the user.

In order to ensure the user is engaged with the message, the navigator could measure exemplary parameters in an instrumented viewport: scrolling the window to display more of the message, entering a response with a text string, moving a cursor, touching a screen, and an elapsed time of the viewport displaying the message. If enabled by the user, a rear (front?) facing camera could track gestures or expressions.

At minimum the navigator provides an instrumented viewport and navigation control to sense when the message précis substantially enters the viewport, when the user opens a message, and when the user deletes a message. These operations trigger timers and operations at the message server or transformer. A fleeting glimpse of the précis while the viewport scrolls to the bottom does not trigger. The précis has to be within the viewport above a threshold of time to be "substantially" entering the viewport.

If the message delivery has been satisfactory, the transformer uses a circuit to transmit to the proffered benefit server a report which identifies a beneficiary of an incentivized message fulfillment when a minimum quantum of message engagement has been determined prior to expiration of a proffered benefit. Recipient could donate to a favorite charity or political campaign.

When the message delivery is moot or fails, the transformer uses a command circuit to delete the message from the message server at the earlier of the expiration date and the user causing the message to be deleted.

A more sophisticated version of the invention includes a message transformation and disposition apparatus (transformer) that retrieves message metadata and body content from a message server to generate a message précis, with recipient's disposition store that contains recipient's previous message dispositions and time to disposal (TTD). As before the transformer is coupled to a proffered benefit server and a navigator.

The user may have considered this message or a similar message before. So, the prior disposition data is used by a circuit that upon receiving the message metadata, determines a proposed TTD and a proposed disposition when recipient has recently disposed a similar message.

This allows the navigator to display a selectable message précis, a benefit, a proposed TTD, and a proposed disposition in an instrumented viewport that senses when a message enters the viewport, when the message is opened, and when the message is deleted. Of course the viewport can distinguish between rapidly transiting the viewport during a scroll to bottom and substantially entering the viewport long enough to be scanned.

The TTD may be used when the viewport determines the précis has substantially been within the viewport. One of the navigator and the transformer has a timer circuit that is triggered by an instrumented viewport and that causes performance of the proposed disposition when the proposed TTD matures absent intervention by the user. Intervention means the user could reset the TTD to much longer or change the proposed disposition. But if the user chooses not to operate on a raft of offers in his inbox, and the proposed disposition is to delete or to archive, sooner or later they will vanish.

Upon a successful message delivery, the invention stores the details of message disposition to disposition store and transmits to the proffered benefit server a report when the user has attended to the message for at least the minimum quantum of engagement prior to the expiration date.

In another embodiment, the user may have trusted correspondents who have already dealt with a messenger who is new to the user. This even more beneficial system offers a message transformation and disposition apparatus (transformer) with recipient's disposition store, the transformer coupled to a reputation server. As before, the transformer is coupled to a proffered benefit server; and, the system includes a précis navigation and viewport control apparatus (navigator).

This embodiment enables the transformer to determine a condition that recipient has not recently disposed of a message similar to an incentivized message and, on that condition, to transmit a request to a reputation server for a proposed TTD and a proposed disposition. In one embodiment the reputation server may be co-located with the transformer apparatus and for economy and efficiency share use of some circuits. In another embodiment, the storage of the reputation server may be remote from the transformer apparatus which may provide improved privacy and security. We describe the reputation server as a separate functional block for clarity of understanding but without restricting the scope of the invention to one embodiment or another.

As described earlier, the navigator displays a message précis, proposed disposition provided by a reputation server, proposed TTD provided by a reputation server, and benefit in an instrumented viewport which senses when a message précis enters the viewport, when a message is opened, when a message is deleted and determines a start time and elapsed time of a message engagement.

The proposed TTD and proposed disposition is affected by user's selected benefit limits, objectives, and preferences and may be overridden within the navigator.

A timer is initialized by the instrumented viewport to the proposed TTD and a circuit performs the proposed disposition when the timer matures.

An embodiment enables a user to organize the display of message precises by retrieving from the benefit proffer server a minimum quantum of engagement within the viewport, the benefit offered upon fulfilling the minimum quantum of engagement, and at least one of a decay rate and an expiration date. By indicating a preference for one of or a tradeoff among "costs" and benefits, the user can cause a display of selectable list ranked by at least one of the benefit, the expiration date, and the minimum quantum of engagement.

To enable more complex operations, the system includes a user-operated control panel whereby a recipient determines message senders whose dispositions shall inform a proposed TTD and proposed disposition, and a beneficiary to receive proffered benefits, and a minimum or maximum of benefits, time expended, or messages attended to control the viewport display. With this the user may select or request that senders known to him (as recorded in his disposition history) either by type of relationship or by identity influence (by their disposition histories) a proposed TTD and a proposed disposition. An example would be those senders with whom the recipient has exchange non-hostile reply-to messages more than a threshold of times. Another example would be those senders whose messages recipient has opened within 15 minutes of being displayed in his viewport in the last 4 weeks.

In an embodiment, the user makes his dispositions available for other recipients to use by reciprocally transmitting to a reputation server recent dispositions. This could be done when transmitting commands to a message server to dispose of messages or as a separate operation.

The invention is easily distinguished by transforming a message into a précis which includes a thumbnail reduced size image derived from a video or a soundbite.

The invention is easily distinguished by transforming a message into a précis which includes a text string excerpted from a message body along with a proposed TTD and a proposed disposition and proffered benefit.

The techniques described herein can be implemented in digital electronic circuitry, or in computer hardware, firmware, software, or in combinations of them. The techniques can be implemented as a computer program product, i.e., a computer program tangibly embodied in a non-transitory medium, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

SEQUENCE LISTING

Not Applicable

The invention claimed is:

1. A system comprising:
a first server comprising a message server that stores message metadata and body content of a plurality of messages from one or more senders or one or more recipients of the plurality of messages;
a second server comprising a disposition server that stores disposition parameters that are associated with one or more predetermined messages of the plurality of messages at the message server, the disposition parameters defining (a) one or more predetermined dispositions of a predetermined message occurring at an earlier of an expiry of a time limit or fulfillment of one or more interaction requirements and (b) the one or more interaction requirements for a recipient of the predetermined message that, if executed by the recipient, causes an execution of the one or more predetermined dispositions against the predetermined message, wherein the disposition server is independent of the message server;
a message transformation and disposition apparatus (disposer) that retrieves message metadata and body content of the predetermined message from the message server, wherein the disposer is in operable communication with the disposition server to retrieve the disposition parameters of the predetermined message including:
(i) the expiry of the time limit that indicates a time limit that the recipient must engage in a minimum quantum of engagement with the predetermined message to trigger an execution of a preferential disposition of the one or more predetermined dispositions associated with the predetermined message,
(ii) the minimum quantum of engagement defining one or more minimum interactions that the recipient is required to perform with the predetermined message to trigger the execution of the preferential disposition, wherein the minimum quantum of engagement is performed after receipt of the predetermined message by the recipient and before the expiry to trigger the execution of the preferential disposition, and (iii) the preferential disposition for interacting with the predetermined message at least the minimum quantum of engagement before the expiry; and
a navigation and viewport control apparatus (navigator) that:
(i-a) displays a version of the predetermined message in a selectable form together with the preferential disposition and the expiry;
(i-b) enables message deletion, message moving, message forwarding, message flagging, and message opening;
(i-c) measures the recipient engagement with the predetermined message, wherein the disposer causes the execution of the preferential disposition of the predetermined message if the measurement of the recipient engagement satisfies the minimum quantum of engagement, or
wherein the disposer further comprises causes a command circuit to automatically delete the predetermined message from the message server if the expiry has matured and the recipient has not met the minimum quantum of engagement.

2. The system of claim 1 wherein the minimum quantum of engagement is at least one or more of:
scrolling a window to display more of the predetermined message, entering a response to the predetermined message with a text string, moving a cursor, touching a screen, and an elapsed time of an instrumented viewport of the navigator displaying the predetermined message.

3. The system of claim 1 wherein the navigator comprises an instrumented viewport and navigation control to sense when the predetermined message substantially enters the instrumented viewport, when the recipient opens the predetermined message, and when the recipient deletes the predetermined message.

4. The system of claim 1 wherein the disposer further comprises:
a circuit to transmit to the disposition server a report to identify when the minimum quantum of message engagement has been determined prior to the expiry.

5. A system comprising:
a first server comprising a message server that stores message metadata and body content of a plurality of messages from one or more senders or one or more recipients of the plurality of messages;
a second server comprising a disposition server that stores disposition parameters that are associated with one or more predetermined messages of the plurality of messages at the message server, the disposition parameters defining (a) one or more predetermined dispositions of a predetermined message occurring at an earlier of an expiry of a time limit or fulfillment of one or more interaction requirements and (b) the one or more interaction requirements for a recipient of the predetermined message that, if executed by the recipient, causes an execution of the one or more predetermined dispositions against the predetermined message, wherein the disposition server is independent of the message server;
a message disposition database (disposition store) that stores historical message disposition data of the recipient and associated historical time to disposal (TTD) data for each historical message, wherein the historical time to disposal indicates a time from a receipt of a historical message by the recipient to an action to the historical message by the recipient that temporarily or permanently resolved the historical message;
a message transformation and disposition apparatus (transformer) that:
retrieves message metadata and body content of a message from the message server, and
generates a selectable message precis using: (i) the message metadata and the body content of the message, (ii) historical disposition data from the disposition store, and (iii) historical time to disposal data from the disposition store, wherein transformer is in operable communication with the disposition server; and,
a precis navigation and viewport control apparatus (navigator) that displays the message precis within an instrumented viewport, wherein the selectable message precis comprises a preferential disposition of the one or more predetermined dispositions for the message and an expiration of the preferential disposition.

6. The system of claim 5 wherein the transformer further comprises:
a circuit that upon receiving the message metadata determines:
(a) a proposed time to disposal (proposed TTD) for the message, wherein the circuit determines the proposed time to disposal using the historical time to disposal data associated with one or more historical messages previously disposed by the recipient, and
(b) a proposed disposition for the message when the recipient has recently disposed a similar message, wherein the circuit determines the proposed disposition using historical disposition data associated with the similar message;
wherein the navigator displays the message precis together with the proposed TTD and proposed disposition of the message.

7. The system of claim 5 wherein the navigator comprises:
a circuit to display a selectable message precis, a proposed TTD, and a proposed disposition in the instrumented viewport that senses when the predetermined message enters the viewport, when the message is opened, and when the message is deleted.

8. The system of claim 7 wherein the transformer further comprises:
a timer that is triggered by the instrumented viewport and that causes performance of the proposed disposition of the predetermined message when the proposed TTD matures absent intervention by the recipient, wherein the timer measures a time from a receipt of the predetermined message within the instrumented viewport to a time of the proposed TTD.

9. The system of claim 5 wherein the transformer further comprises:
a circuit to store details of message disposition to a disposition store and to transmit to the disposition server a report when the recipient has interacted with the message for at least the minimum quantum of engagement prior to expiry.

10. A system that comprises:
a first server comprising a message server that stores message metadata and body content of a plurality of messages from one or more senders or one or more recipients of the plurality of messages;
a second server comprising a disposition server that stores disposition parameters that are associated with one or more predetermined messages of the plurality of messages at the message server, the disposition parameters defining (a) one or more predetermined dispositions of a predetermined message occurring at an earlier of an expiry of a time limit or fulfillment of one or more interaction requirements and (b) the one or more interaction requirements for a recipient of the predetermined message that, if executed by the recipient, causes an execution of the one or more predetermined dispositions against the predetermined message, wherein the disposition server is independent of the message server;

a third server comprising a reputation server, wherein the reputation server is independent of the first server and the second server;

a message disposition database (disposition store) that stores historical message disposition data of the recipient and associated historical time to disposal (TTD) data for each historical message, wherein the historical time to disposal indicates a time from a receipt of a historical message by the recipient to an action to the historical message by the recipient that temporarily or permanently resolved the historical message;

a message transformation and disposition apparatus (transformer) with recipient's disposition store, the transformer coupled to the reputation server, the transformer coupled to the disposition server; and, a precis navigation and viewport control apparatus (navigator) that displays a version of the predetermined message.

11. The system of claim 10 wherein the transformer comprises:
   a circuit to determine a condition that recipient has not disposed of a previous message similar to the predetermined message; and, on that condition,
   in response to the determination of the condition, the circuit transmit a request to the reputation server for a proposed time-to-disposition (TTD) and a proposed disposition.

12. The system of claim 10 wherein the navigator comprises:
   a circuit to display a message precis, proposed disposition provided by the reputation server, and a proposed TTD provided by the reputation server in an instrumented viewport which senses when a message precis of the predetermined message enters the instrumented viewport, when the predetermined message is opened, when the predetermined message is deleted and determines a start time and elapsed time of a message engagement.

13. The system of claim 12 wherein the proposed TTD and the proposed disposition is affected by the recipient's selected objectives and preferences and may be overridden within the navigator.

14. The system of claim 12 wherein the transformer further comprises:
   a timer initialized by the instrumented viewport that measures maturity at the proposed TTD; and,
   a circuit to perform the proposed disposition when the timer matures.

15. The system of claim 10 further comprising: a recipient-operated control panel whereby a recipient determines message senders whose dispositions shall inform the proposed TTD and the proposed disposition, time expended, or messages attended to control the viewport display.

16. The system of claim 10 wherein the transformer further comprises:
   a circuit to transmit to a reputation server recent dispositions,
   a circuit to transmit commands to the message server to dispose of messages,
   a circuit to store the details of message disposition to the disposition store, and
   a circuit to transmit to the disposition server a report when the recipient has interacted with the message for at least the minimum quantum of engagement prior to the expiry.

17. The system of claim 10 wherein the message precis comprises a thumbnail reduced size low resolution image from a video or a soundbite generated by a circuit to transform the predetermined message.

18. The system of claim 10 wherein the message precis comprises an image of a text string excerpted from a message body by a circuit to transform the predetermined message.

* * * * *